No. 623,858. Patented Apr. 25, 1899.
T. G. WILSON.
STEAM COOKER.
(Application filed Oct. 13, 1898.)
(No Model.)
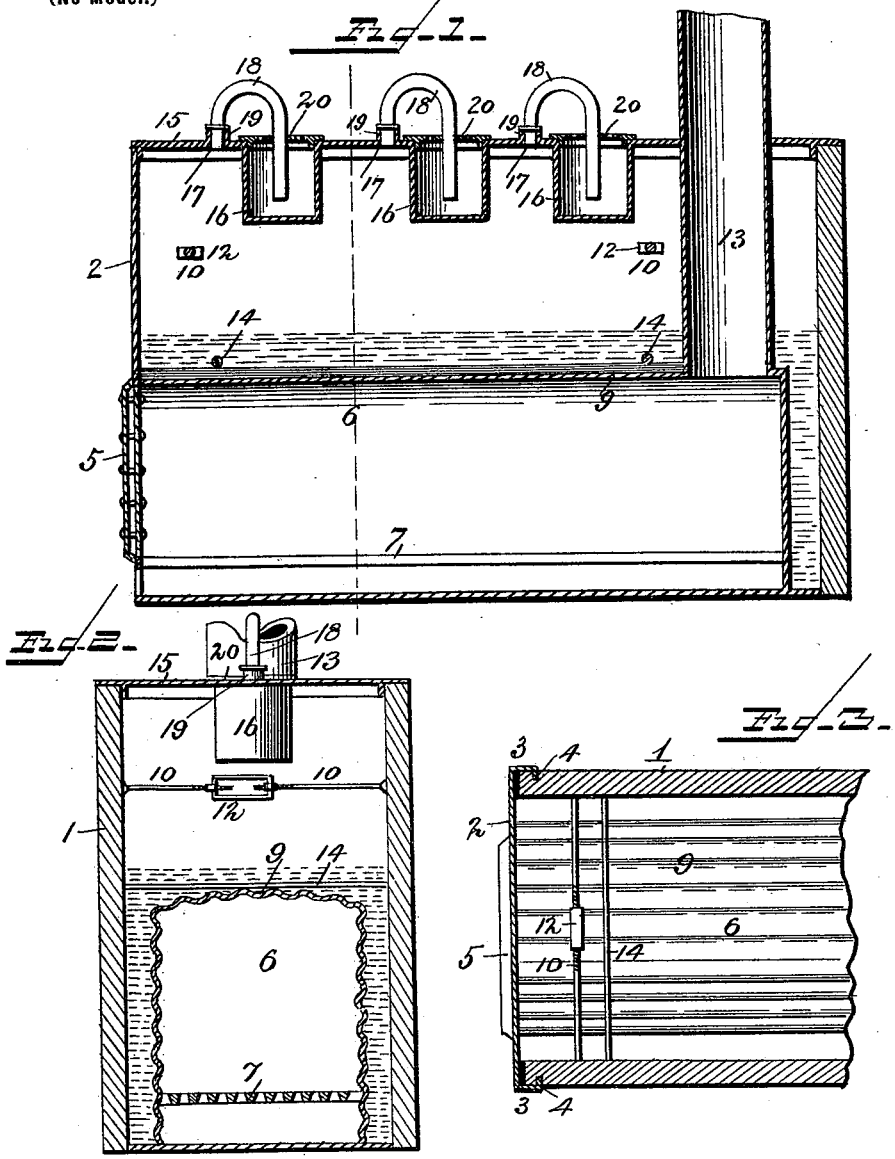
Witnesses:
F. L. Ourand
Jos. L. Coombs
Inventor:
Theophilus G. Wilson
by James Duggan
Attorneys

UNITED STATES PATENT OFFICE.

THEOPHILUS G. WILSON, OF CHAPEL HILL, NORTH CAROLINA.

STEAM-COOKER.

SPECIFICATION forming part of Letters Patent No. 623,858, dated April 25, 1899.

Application filed October 13, 1898. Serial No. 693,393. (No model.)

*To all whom it may concern:*

Be it known that I, THEOPHILUS G. WILSON, a citizen of the United States, residing at Chapel Hill, in the county of Orange and State of North Carolina, have invented new and useful Improvements in Steam-Cookers, of which the following is a specification.

My invention relates to steam-cookers; and its object is to provide an improved construction of the same whereby articles of food may be cooked for immediate use and whereby also food products contained in cans may be cooked, which cans are subsequently hermetically sealed for future use.

The invention consists in the novel construction and combination of parts hereinafter fully described and claimed.

In the accompanying drawings, Figure 1 is a central longitudinal section of a steam-cooker constructed in accordance with my invention, the same being shown as used for cooking articles for immediate or table use. Fig. 2 is a transverse section of the same. Fig. 3 is a detail horizontal section.

In the said drawings the reference-numeral 1 designates the casing of the apparatus, the sides and rear of which are made of wood, while the front 2 is of metal, having the edges bent backwardly and then inwardly, forming flanges 3, which engage with grooves 4 in the sides of the casing, near the front end thereof. The said front is provided with a door 5, communicating with a heater 6, located in said casing, which heater is provided with a grate 7. This heater consists of an arched metal plate 9, the ends of which rest upon the bottom of the casing.

The numeral 10 designates two screw-rods, the outer ends of which abut against the inner sides of the sides or side walls of the casing, while the inner ends are connected with a screw thimble or swivel 12, the construction of which is such that as it is turned in one direction the sides of the casing will be spread or forced apart, so as to make a tight joint with the said flanges 3 of the metal front of the casing. An asbestos or other fireproof packing is interposed between the casing and said front, so as to make a water and fire proof joint therebetween and prevent charring of the wooden sides.

The numeral 13 designates the smoke-flue for the heater, and there is a space between the heater and the casing forming a water-receptacle, while the space above the heater is a steam-space.

The numeral 14 designates transverse rods secured to the casing above the heater. The said heater is corrugated, thereby presenting a large heating area and also radiating the heat much better than if made plain.

The numeral 15 designates the cover of the apparatus, consisting of a metal plate having a number of depressions 16, which serve as food-receptacles. Formed adjacent to these depressions or receptacles are holes 17 for the passage of curved pipes or goosenecks 18, and around these holes are flanges 19. The long arms of these goosenecks extend down into the receptacles 16, while the short arms pass through the said flanges and are flush with the inner side of the cover. The numeral 20 designates covers for said receptacles 16, formed with central holes for the passage of the goosenecks and also with perforations for the escape of steam.

When the apparatus is used for cooking articles or food products contained in cans, the cover 15 is removed and the cans are placed in baskets of wire or perforated metal and lowered into the casing 1, which baskets rest on the rods 14.

In using the apparatus as in the construction first described the articles to be cooked are placed in the receptacles 16 with the long arms of the goosenecks extending down into said receptacles. Steam from the apparatus will now escape through the goosenecks into the said receptacles and will cook the food contained therein. At the same time the steam in the apparatus will surround said receptacles and aid in the cooking. When it is not desired to use the goosenecks, they are removed, and the holes in the cover through which they pass are closed by means of caps fitting over the same.

When the apparatus is to be used for cooking food products contained in cans, the cover 15 is removed and the cans placed in suitable baskets, which are let down into the apparatus, as before described.

In Fig. 1 the smoke-flue of the heater is shown as being vertical, but it may be horizontal, as when the heater is connected with an oven, if desired.

Having thus fully described my invention, what I claim is—

1. In a cooker of the character described, the combination with the wooden casing having vertical grooves near the front ends the metal front having its ends bent backwardly and inwardly forming flanges engaging with said grooves and the screw-rods abutting against the inner side of said casing and provided with a screw-threaded swivel, substantially as specified.

2. In a steam-cooker, the combination with the casing and heater, with a water space or chamber therebetween, of the cover having depressions forming food-receptacles, and formed with holes and flanges adjacent thereto, the movable goosenecks having long arms extending into said receptacles and the short arms extending through said holes and communicating with the interior of the casing and the perforated covers carried by said goosenecks, substantially as described.

In testimony whereof I have hereunto set my hand in presence of two subscribing witnesses.

THEOPHILUS G. WILSON.

Witnesses:
E. P. BURKET,
BENNETT S. JONES.